(12) United States Patent
Noel

(10) Patent No.: US 11,872,775 B2
(45) Date of Patent: Jan. 16, 2024

(54) FIBER PLACEMENT HEAD WITH AUGMENTED RESTART

(71) Applicant: Fives Machining Systems, Inc., Fond du Lac, WI (US)

(72) Inventor: Michael Noel, Sunman, IN (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 0 days.

(21) Appl. No.: 17/750,786

(22) Filed: May 23, 2022

(65) Prior Publication Data

US 2022/0371289 A1 Nov. 24, 2022

Related U.S. Application Data

(60) Provisional application No. 63/191,420, filed on May 21, 2021.

(51) Int. Cl.
*B29C 70/38* (2006.01)

(52) U.S. Cl.
CPC .................... *B29C 70/388* (2013.01)

(58) Field of Classification Search
CPC ... B29C 70/388; B29C 70/386; B29C 70/384; B29C 70/382; B29C 70/38; B29C 70/545
See application file for complete search history.

(56) References Cited

U.S. PATENT DOCUMENTS

| 5,110,395 A | 5/1992 | Vaniglia |
| 5,290,389 A | 3/1994 | Shupe et al. |
| 8,408,266 B2 | 4/2013 | Lizarralde Dorronsoro et al. |
| 10,059,042 B2 | 8/2018 | Schneider et al. |
| 2012/0241093 A1* | 9/2012 | Borgmann ............ B29C 70/384 |
| | | 156/350 |
| 2014/0202640 A1* | 7/2014 | Vaniglia .................. B29C 70/38 |
| | | 156/538 |
| 2015/0273736 A1 | 10/2015 | Schneider et al. |
| 2019/0118410 A1 | 4/2019 | Caffiau et al. |

(Continued)

FOREIGN PATENT DOCUMENTS

| EP | 0493739 A1 | 7/1992 |
| EP | 2263864 A1 | 12/2010 |
| EP | 2207744 A4 | 3/2011 |

(Continued)

OTHER PUBLICATIONS

International Search Report for International Application No. PCT/US2022/030504 dated Sep. 6, 2022 (3 pages).

(Continued)

*Primary Examiner* — George R Koch
(74) *Attorney, Agent, or Firm* — REISING ETHINGTON P.C.

(57) ABSTRACT

A fiber placement head for applying a plurality of composite tape segments on a mold, including a pre-start lane assembly having a pre-start power roller that moves a composite tape segment from a composite tape source; a restart lane assembly having a restart power roller that also moves the composite tape segment from the composite tape source; and a cutting lane assembly having a reciprocating cutting blade, wherein the pre-start power roller draws composite tape from the composite tape source and the restart power roller positions a composite tape segment on a mold.

10 Claims, 4 Drawing Sheets

(56) References Cited

U.S. PATENT DOCUMENTS

2022/0134684 A1     5/2022   Suzuki et al.

FOREIGN PATENT DOCUMENTS

| | | |
|---|---|---|
| EP | 2727693 B1 | 1/2015 |
| EP | 2433784 B1 | 6/2017 |
| EP | 2502735 B1 | 9/2019 |
| JP | 2020131623 A | 8/2020 |

OTHER PUBLICATIONS

Written Opinion for International Application No. PCT/US2022/030504 dated Sep. 6, 2022 (4 pages).

\* cited by examiner

FIBER PLACEMENT HEAD WITH AUGMENTED RESTART

TECHNICAL FIELD

The present application relates to fiber placement machines and, more particularly, to a fiber placement head.

BACKGROUND

Fiber placement machines are used to create composite workpieces. Composite material or tape, in the form of fibrous material impregnated with resin, is applied by the machines to a mold or mandrel at precise locations and lengths to collectively form a composite workpiece. The fiber placement machines move a fiber placement head over the mold to precisely apply composite tape in the ultimate shape of the composite workpiece. As the fiber placement head moves, it leaves a plurality of composite tape segments, also referred to as a course, or tows, behind on the mold. While a plurality of composite tape segments can be simultaneously applied as part of the course, the fiber placement head can individually control each of the tows as part of applying the course. The automatic application of these composite tape segments to the mold involves the cooperation of a diverse collection of machinery that holds, moves, and ultimately cuts the composite tape.

The fiber placement head can include cutting, clamping, and moving features that draw the composite tape from a source, segment each lane of the composite tape, and apply the composite tape segments to the mold. As the speed at which the fiber placement head applies the composite tape segments increases, so does the challenge of choreographing the cooperation of the cut, clamp, and movement of composite tape through the head to the mold with sufficient accuracy.

SUMMARY

In one implementation, a fiber placement head for applying a plurality of composite tape segments on a mold includes a pre-start lane assembly having a pre-start power roller that moves a composite tape segment from a composite tape source; a restart lane assembly having a restart power roller that also moves the composite tape segment from the composite tape source; and a cutting lane assembly having a reciprocating cutting blade, wherein the pre-start power roller draws composite tape from the composite tape source and the restart power roller positions a composite tape segment on a mold.

In one implementation, a fiber placement head for applying a plurality of composite tape segments on a mold includes a pre-start lane assembly having a pre-start power roller that moves a composite tape segment from a composite tape source; a restart lane assembly having a restart power roller that also moves the composite tape segment from the composite tape source; and a cutting lane assembly having a reciprocating cutting blade, wherein the pre-start power roller draws composite tape from the composite tape source and reduces an amount of tension between the pre-start power motor and the restart power motor while the restart power roller positions a composite tape segment on a mold.

DETAILED DESCRIPTION

Figure 1:
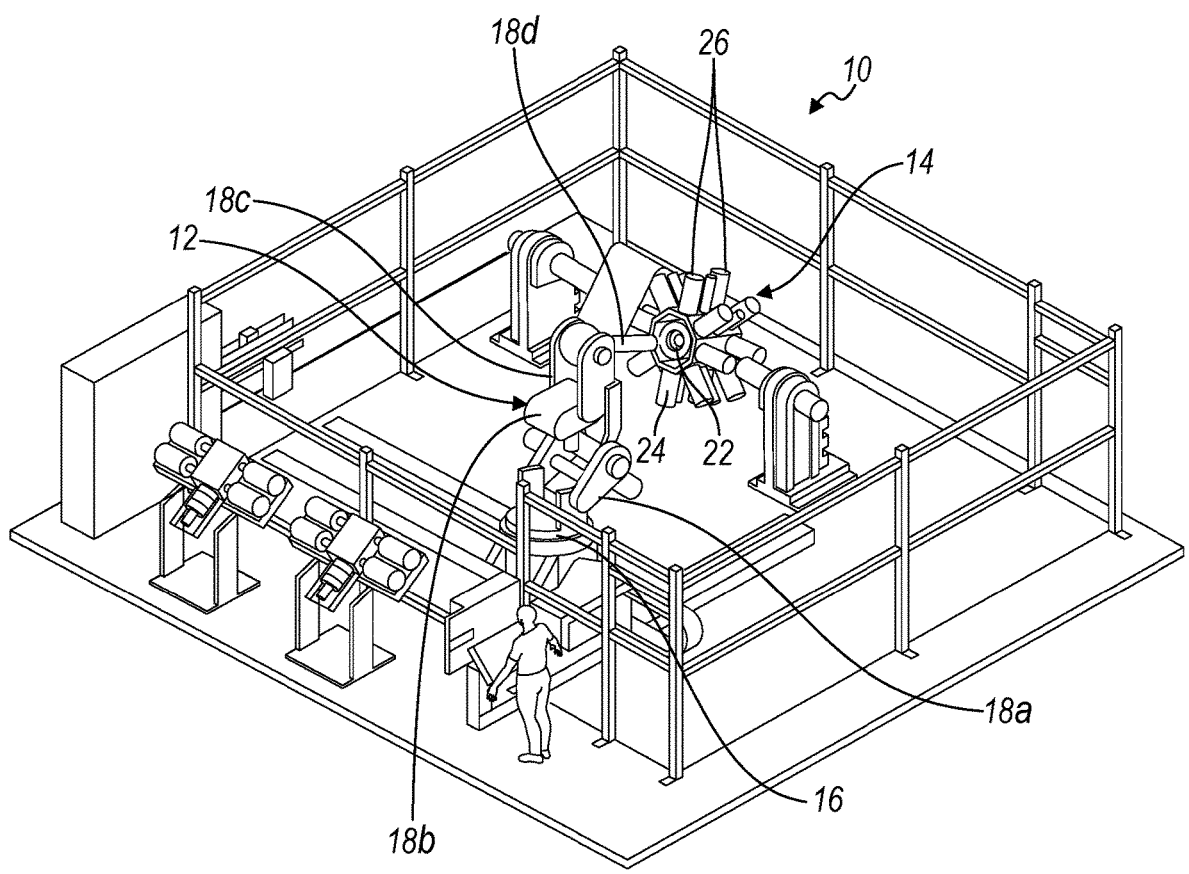
FIG. 1 is a perspective view depicting an implementation of a fiber placement machine.

A fiber placement machine can use a robotic arm carrying a fiber placement head having a cut, clamp, and restart (CCR) assembly. The CCR assembly includes a plurality of cutting lane assemblies, clamping lane assemblies, restarting lane assemblies, and pre-starting lane assemblies each of which can be removably coupled to the fiber placement head. Each lane assembly can be designed to process one or more strands of composite tape that pass through it. The pre-starting and restarting lane assemblies can work together to pull composite tape from a fiber source and move the tape to the mold.

Past fiber placement heads have lacked a pre-starting lane assembly and have instead relied solely on a restarting lane assembly and its driven roller to both pull fiber from the composite tape source, such as a spool, and also to deliver the composite tape to the mold. The use of the restarting lane assembly to both remove composite tape from the composite tape source and feed the composite tape so that it can be positioned on the mold at higher layup speeds (e.g., >900 in/min) can result in elevated tension on the composite tape as it is pulled from the composite tape source. For example, at higher layup speeds, a clamping lane assembly can hold a composite tape segment and then suddenly release the segment. The release of the composite tape segment can put a momentary spike of tension on the composite tape segment as the clamping lane assembly releases the tape and the restart lane assembly accelerates the composite tape segment to the mold. The spike of tension can displace or slip the composite tape segment relative to a restart roller thereby resulting in position inaccuracies when the tape segment is applied to the mold.

The inclusion of a pre-starting lane assembly along with a re-starting lane assembly on the fiber placement head can remove composite tape from the composite tape source and also accurately position composite tape segments on the mold avoiding the momentary spike in tension on the composite tape. For example, the pre-starting assembly can include a powered roller and a pinch roller that can be positioned nearest the composite tape source and collectively be responsible for drawing composite tape from the source. The performance of the pre-starting assembly can be designed to draw the composite tape from the composite tape source and deliver the tape toward the clamping lane assembly and restarting lane assembly. The restarting lane assembly can include a powered roller and a pinch roller and be primarily responsible for positioning the composite tape on the mold. The restarting lane assembly and the pre-starting lane assembly can work in concert to introduce an amount of slack in the composite tape in between these assemblies. For instance, the pre-starting lane assembly can operate its powered roller at a slightly higher angular velocity than the powered roller of the restarting lane assembly. This can reduce or eliminate tension on the composite tape segment downstream of the pre-starting lane assembly and help the restarting lane assembly more accurately position the composite tape segment on the mold.

An implementation of a fiber placement machine 10 is shown in FIG. 1. The fiber placement machine 10 includes a robotic arm 12 that is detachably coupled with a fiber placement head 14. The robotic arm can be supported by a base 16 upon which it moves linearly about an axis (x). A plurality of moveable segments 18, that can move by pivoting, rotating, or telescoping for example, may extend outwardly from the base 16. The robotic arm 12 can move relative to the base 16 about multiple axes. For example, a first segment 18a can rotatably couple to the base 16 at one end such that the robotic arm 12 can rotate about the base 16. A second segment 18b can pivotably couple with the first segment 18a and a third segment 18c can pivotably couple with the second segment. A fourth segment 18d can be coupled to the third segment 18c and telescopically move away from and toward the third segment. The segments 18 can be moved relative to each other using fluidic rams, electric motors, or some combination of these or other drive elements to move a distal end of the robotic 12 arm relative to a mold 20 or mandrel used to create a workpiece.

A microprocessor (not shown) in communication with a computer readable storage medium having executable instructions can control movement of the fluidic rams, electric motors, or other drive element thereby controlling the motion and position of the moveable segments 18 of the robotic arm 12. The microprocessor can be any type of device capable of processing electronic instructions including microcontrollers, host processors, controllers, and application specific integrated circuits (ASICs). It can be a dedicated processor used only to carry out control of the robotic arm 12 or can be shared with other machine functions. The microprocessor executes various types of digitally-stored instructions, such as software or firmware programs stored in memory. Communications between the mechanism that moves the robotic arm, such as the fluidic rams or electric motors, and the microprocessor can be carried out over a communications bus. The robotic arm 12 can move the fiber placement head 14 along three axes to position the head 14 for service or to apply composite tape to the mold 20. While this is one implementation of a robotic arm 12 that can be used with a fiber placement head, other implementation of robotic arms or mechanical devices that apply composite tape can be used as well.

The end of the robotic arm 12 distal to the base 16 can include a chuck 22 that releasably engages the fiber placement head 14. The chuck 22 and a portion of the fiber placement head 14 can have corresponding features such that the chuck 22 can releasably grab the fiber placement head 14. In one implementation, the fiber placement head 14 includes a cylindrical shank extending orthogonal to a surface of the head 14. The robotic arm 12 can position the chuck 22 so that it engages the shank and the fiber placement head 14 is resiliently coupled to the arm 12.

Figure 2:
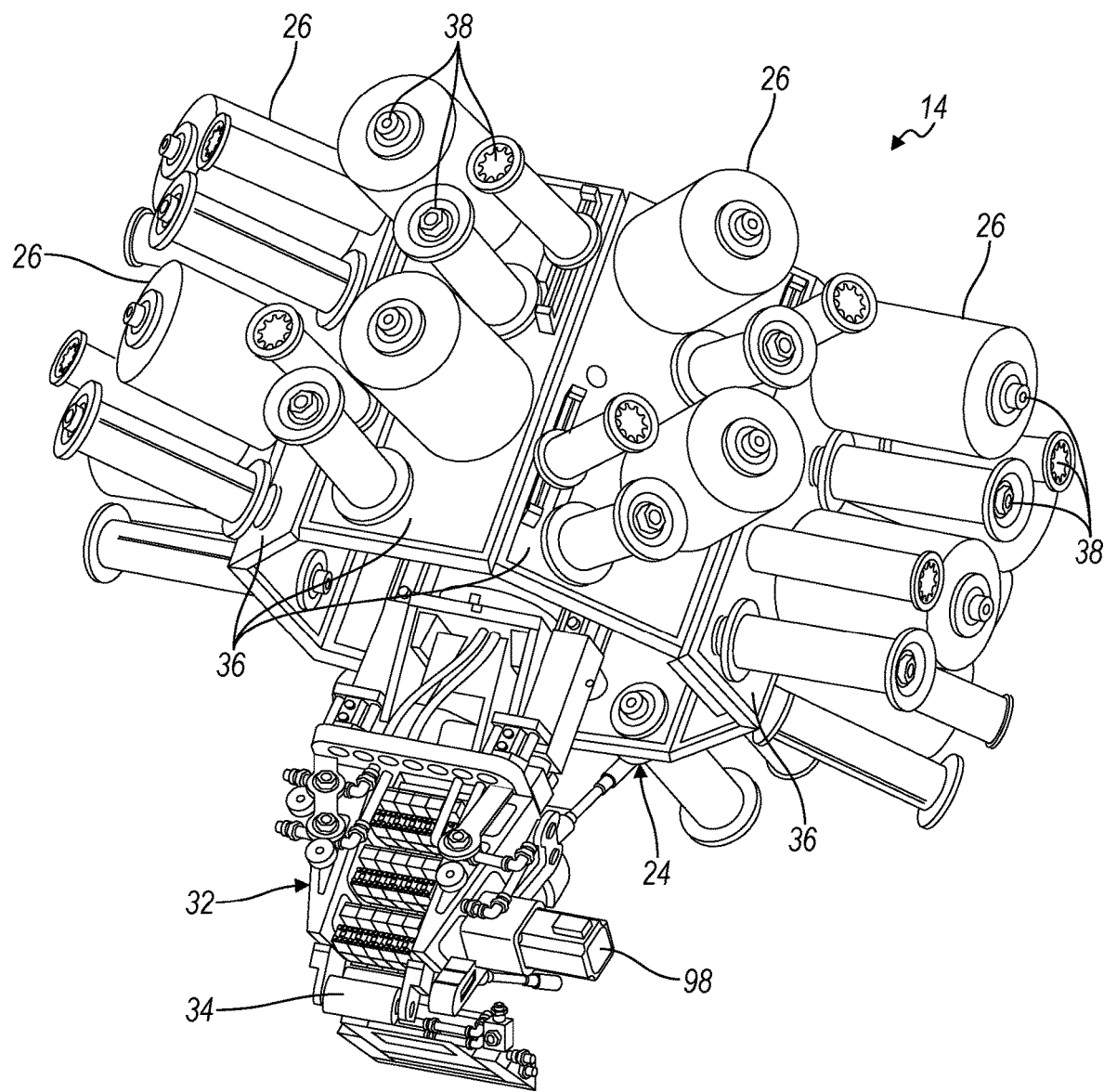
FIG. 2 is another perspective view depicting an implementation of a fiber placement head.
Figure 3:
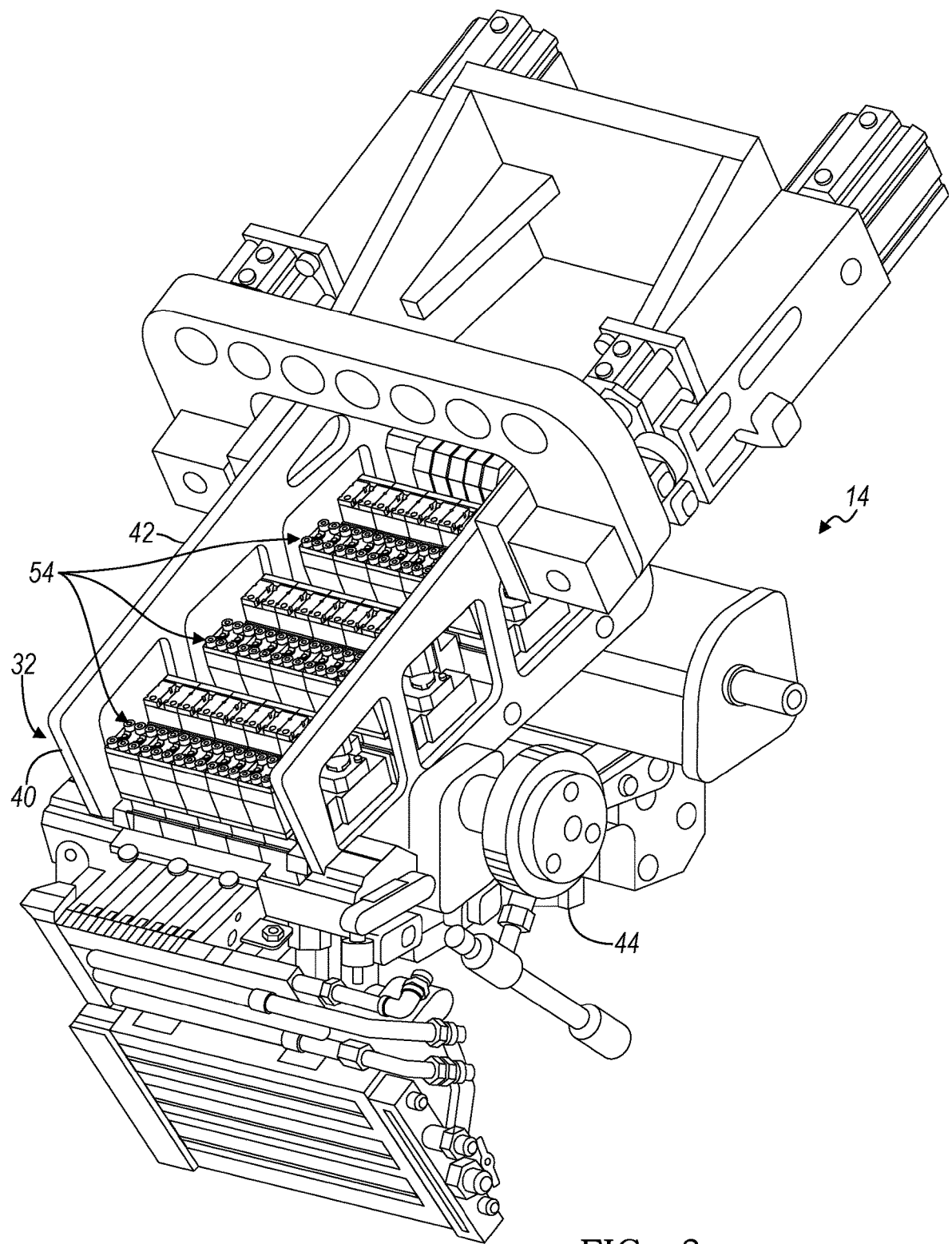
FIG. 3 is a perspective view depicting an implementation of a portion of a fiber placement head.
Figure 4:
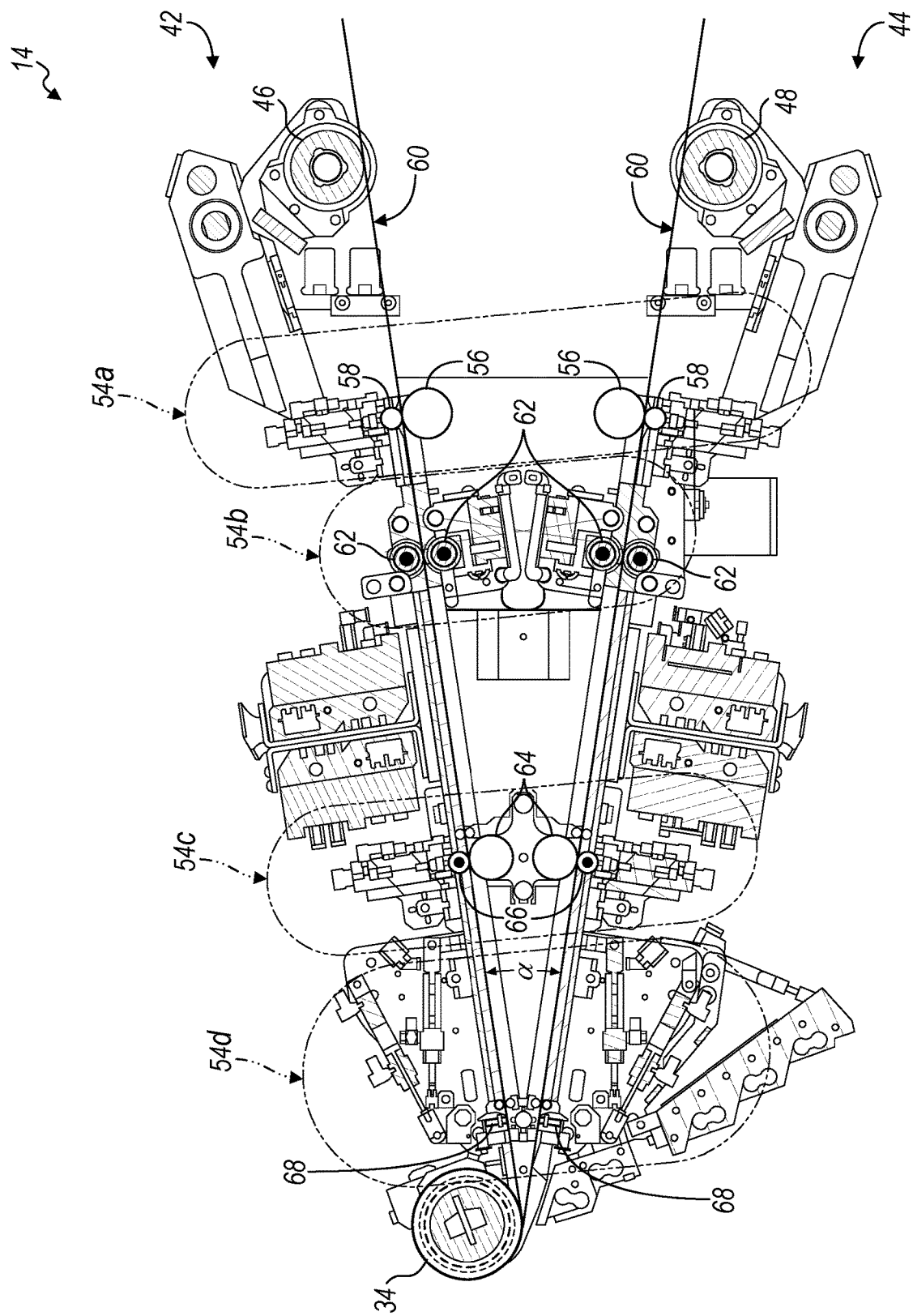
FIG. 4 is another perspective view depicting an implementation of a portion of a fiber placement head.

As shown in FIGS. 2-4, the fiber placement head 14 can include a creel 24 including a plurality of spools 26 that store composite tape as a source of this tape for the head 14, and a cut, clamp, restart (CCR) assembly 32. The CCR assembly 32 can include a compaction roller 34 that can receive the composite tape from the spools 26 and apply it to the mold 20 to create a composite part. The creel frame 24 includes a plurality of outer surfaces 36 and spindles 38 mounted orthogonally relative to the outer surfaces 36. The spindles 38 can be moved to create tape tension using dancer elements controlled pneumatically, mechanically, or fluidically that help maintain tension on the composite tape as the tape is applied to the mold 20. The composite tape can unwind from the spools 26 and travel into the compaction roller 34 for ultimate application to the mold 20.

The fiber placement head 14 can include a CCR frame 40 for supporting the components of the fiber placement head 14, the CCR assembly 32, and the compaction roller 34 that ultimately presses the course of composite tape segments onto the mold 20. Before arriving at the compaction roller 34, a portion of the composite tapes can pass through an upper feed portion 42 and another portion of the composite tapes can pass through a lower feed portion 44. The upper feed portion 42 can process even numbered composite tape and the lower feed portion 44 can process odd numbered composite tape that meet at the compaction roller 34. For instance, for a fiber placement head 14 having eight fiber pathways or lanes, the upper feed portion 42 can process composite tape identified by numbers 2, 4, 6, and 8 while the lower feed portion 44 can process composite tape identified by numbers 1, 3, 5, and 7. The upper feed portion 42 and the lower feed portion 44 can be separated by an angle (a). An upper feed roller 46 and lower feed roller 48 can help direct composite tape from spools 26 to the upper feed portion 42 and lower feed portion 44, respectively. A plurality of lane assemblies 54 can be included with the upper feed portion 42 and the lower feed portion 44. Each of the upper feed portion 42 and the lower feed portion 44 can include a manifold for actuating moving parts of the lane assemblies 54. Electromechanical valves can abut the lane assemblies 54 such that the valve selectively supplies compressed air to the assembly 54 for actuation. In one implementation, the electromagnetic valve includes a solenoid receiving a voltage that is controlled by a switch the microprocessor opens and closes to control actuation of the lane assembly 54.

The lane assemblies 54 include pre-starting lane assemblies 54a, clamping lane assemblies 54b, restarting lane assemblies 54c, and cutting lane assemblies 54d that are carried by the CCR frame 40. Collectively, the lane assemblies 54 draw composite tape from the spools 26 and apply the tape to the mold 20. The pre-starting lane assemblies 54a each can include a pre-start powered roller 56 and a pre-start pinch roller 58 that initially pull the composite tape 60 from the spools 26. The pre-start powered roller 56 can be rotated by an electric motor and include a motor encoder that sends signals to the microprocessor indicating a position of the composite tape 60. The microprocessor can also control the electrical current supplied to the electric motor driving the pre-start powered roller 58. The pre-start powered roller 56 and pre-start pinch roller 58 can be moved to releasably engage opposite sides of the composite tape 60 and rotate in opposite rotational directions to pull the composite tape 60 toward the other lane assemblies 54. In one implementation, the pre-start powered roller 56 and the pre-start pinch roller 58 can be moved closer to or further from the composite tape 60 using compressed air. The composite tape 60 can next pass through the clamping lane assemblies 54b. The clamping lane assemblies 54b can include clamping rollers 62 positioned on opposite sides of the composite tape 60 that releasably engage and hold the tape in a fixed position for a short amount of time. The clamping rollers 62 can be moved closer to or further away from the composite tape and also held to prevent the rollers 62 from rotating to prevent the tape from movement.

The composite tape 60 can then pass through restarting assemblies 54c that may include a restart powered roller 64 and a restart pinch roller 66. The restarting assemblies 54c can be responsible for accurately positioning a segment of composite tape 60 on the mold 20. The restart powered roller 64 can be rotated by an electric motor and include a motor encoder that can send signals to a microprocessor (not shown) indicating the position of the composite tape 60. The microprocessor can also control the electric motor driving the restart powered roller 64 in a similar way as described above with respect to the pre-start powered roller 56. The restart powered roller 64 and restart pinch roller 66 can be moved to engage opposite sides of the composite tape 60 and rotate in opposite rotational directions to precisely position a segment of the composite tape 60 on the mold 20. It is possible to control the pre-start powered roller 58 to rotate at an angular velocity that is greater than the angular velocity at which the restart powered roller 64 rotates for a defined period of time so that tension on the composite tape 60 between the powered rollers 58, 64 is reduced or relieved completely so that slack exists and there is no tension on the composite tape 60. In another implementation, the pre-start powered roller 58 can be operated at the same angular velocity as the restart powered roller 64. The restarting assemblies 54c can then very accurately deploy the segments of composite tape 60 on the mold 20 without interference of elevated composite tape tension. Cutting lane assemblies 54d can include a reciprocating cutting blade 68 to selectively cut the composite tape 60 thereby creating defined lengths of composite tape 60 that are applied to the mold 20 and is part of a workpiece.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fiber placement head for applying a plurality of composite tape segments on a mold, comprising:
   a pre-start lane assembly having a pre-start power roller that moves a composite tape segment from a composite tape source;
   a restart lane assembly having a restart power roller that also moves the composite tape segment from the composite tape source; and
   a cutting lane assembly having a reciprocating cutting blade, wherein the pre-start power roller draws composite tape from the composite tape source and the restart power roller positions a composite tape segment on a mold, wherein the pre-start power roller operates at an angular velocity that is greater than the angular velocity of the restart power roller thereby reducing an amount of tension on the composite tape segment between the pre-start power roller and the restart power roller.

2. The fiber placement head recited in claim 1, wherein the amount of tension is zero.

3. The fiber placement head recited in claim 1, wherein the fiber placement head moves composite tape at a layup speed equal to or greater than 900 inches per minute.

4. The fiber placement head recited in claim 1, further comprising a pre-start pinch roller that releasably engages with the pre-start power roller and holds the composite tape segment.

5. The fiber placement head recited in claim 1, further comprising a restart pinch roller that releasably engages with the restart power roller and holds the composite tape segment.

6. A fiber placement head for applying a plurality of composite tape segments on a mold, comprising:
   a pre-start lane assembly having a pre-start power roller that moves a composite tape segment from a composite tape source;
   a restart lane assembly having a restart power roller that also moves the composite tape segment from the composite tape source; and
   a cutting lane assembly having a reciprocating cutting blade, wherein the pre-start power roller draws composite tape from the composite tape source and reduces an amount of tension between the pre-start power motor and the restart power motor while the restart power roller positions a composite tape segment on a mold, wherein the pre-start power roller operates at an angular velocity that is greater than the angular velocity of the restart power roller thereby reducing an amount of tension on the composite tape segment between the pre-start power roller and the restart power roller.

7. The fiber placement head recited in claim 6, wherein the amount of tension is zero.

8. The fiber placement head recited in claim 6, wherein the fiber placement head moves composite tape at a layup speed equal to or greater than 900 inches per minute.

9. The fiber placement head recited in claim 6, further comprising a pre-start pinch roller that releasably engages with the pre-start power roller and holds the composite tape segment.

10. The fiber placement head recited in claim 6, further comprising a restart pinch roller that releasably engages with the restart power roller and holds the composite tape segment.

* * * * *